July 19, 1932.  W. A. BAKER ET AL  1,867,870

TELETHERMOMETER

Filed July 25, 1924  2 Sheets-Sheet 1

William A. Baker
Carl H. Kuhlman
INVENTORS

BY
ATTORNEY

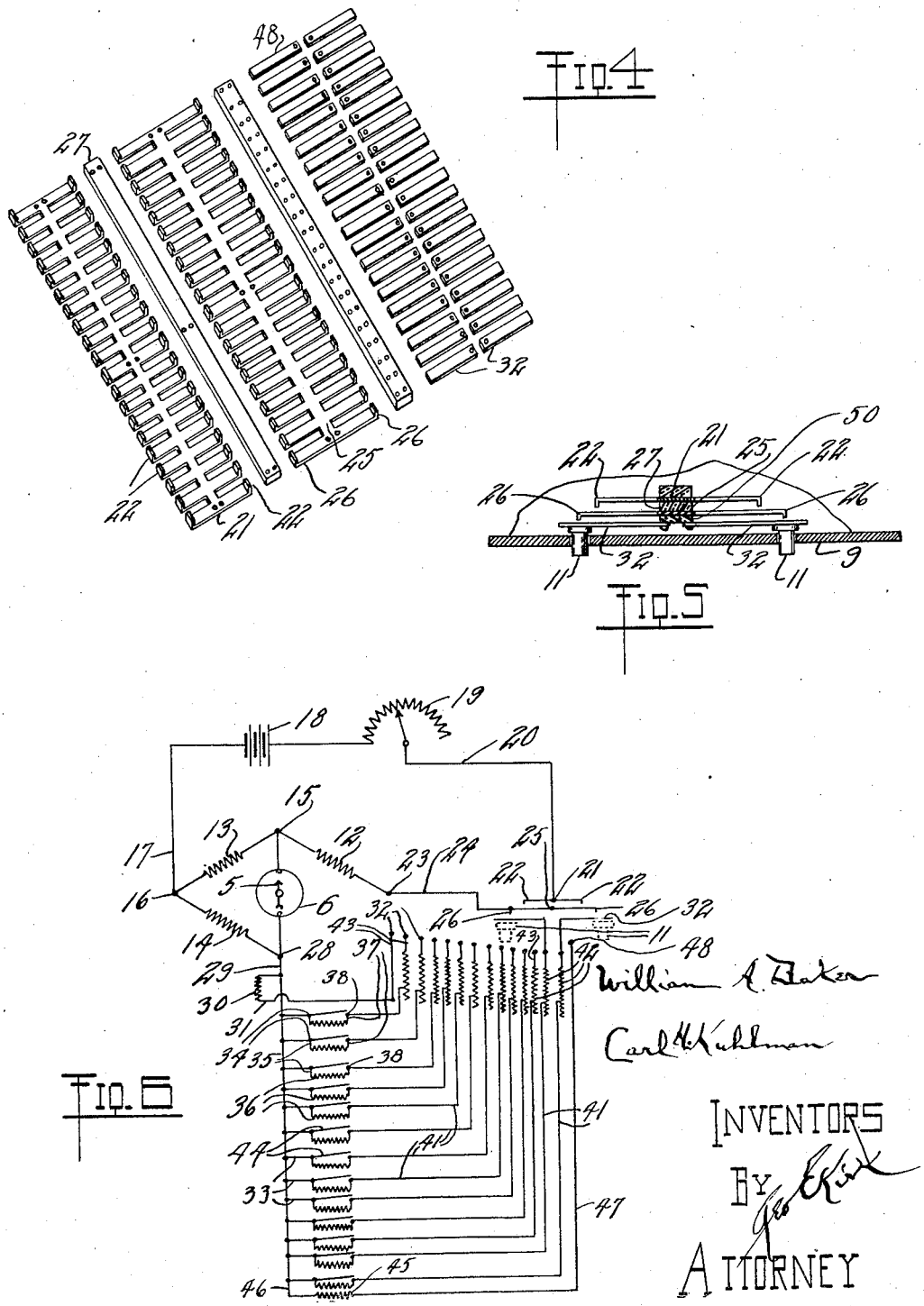

Patented July 19, 1932

1,867,870

UNITED STATES PATENT OFFICE

WILLIAM A. BAKER AND CARL H. KUHLMAN, OF TOLEDO, OHIO, ASSIGNORS TO THE AMERICAN TEMPERATURE INDICATING COMPANY, OF TOLEDO, OHIO, A CORPORATION OF OHIO

TELETHERMOMETER

Application filed July 25, 1924. Serial No. 728,191.

This invention relates to remote temperature reading installations.

This invention has utility when incorporated in electric telethermometers.

Referring to the drawings:

Fig. 4 is a distributed perspective view of the terminals at the central station;

Fig. 5 is a fragmentary section on the line V—V, Fig. 1, and

Fig. 6 is a wiring diagram.

Figure 1:
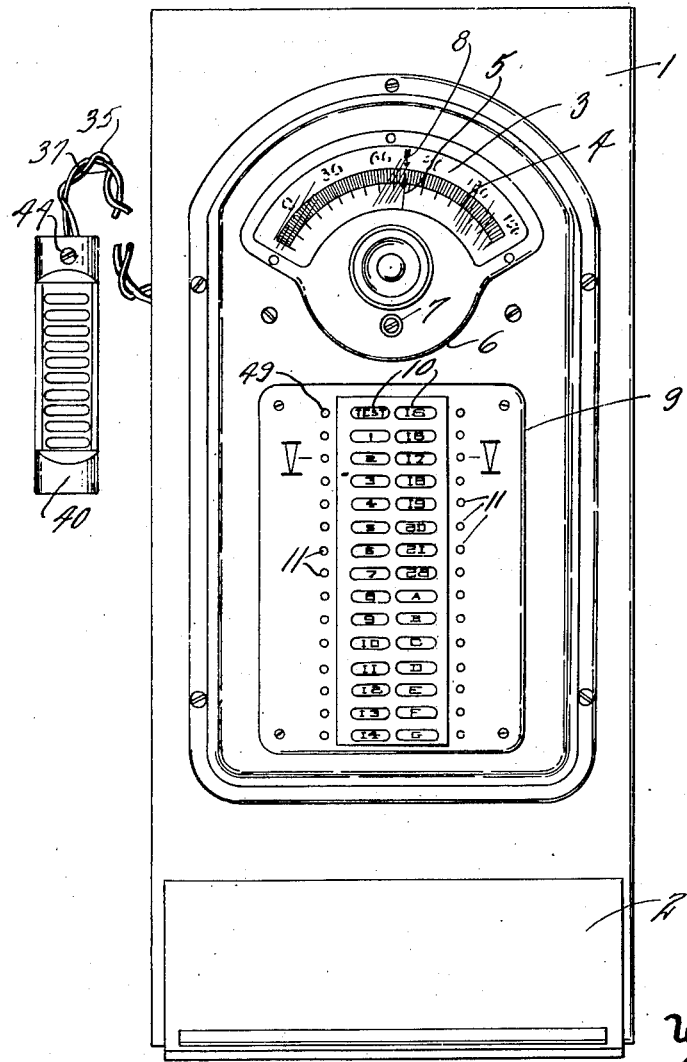
Fig. 1 is a front elevation of a central station, with parts broken away, showing remote temperature responsive devices.

Cabinet 1 is shown as having desk 2 or ledge as a platform for recording data as disclosed by the telethermometer. Window 3 discloses scale 4 over which may travel needle 5 for disclosing readings on the scale 4, which readings as herein adopted are in degrees Fahrenheit. This needle and scale serve as an indicating instrument herein embodied as controlled by galvanometer 6. Adjusting screw 7 may maintain the idle position of the needle 5 at arrow 8. Carried by this panel of the central station but just below this indicating instrument or galvanometer 6 is switch plate 9 carrying identification means 10 for the respective push-button switches 11.

This galvanometer 6 is shown as in a Wheatstone bridge installation embodying legs 12, 13, 14. Terminal 15 between the legs 13, 12, is connected to the galvanometer 6. Terminal 16 between the legs 13, 14, is connected to energy source or battery 18, thence by adjustable resistance 19 and line 20 to bus-bar 21 having yieldable spring finger terminals 22. The Wheatstone bridge resistance or leg 12 remote from the terminal 15 has terminal 23 connected by line 24 to bus-bar 25 having spring fingers 26. This bus-bar 25 is spaced by insulation 27 from the bus-bar 21.

The depression of the push-button switch 11 shifts a terminal finger 32 back to flex the finger 26 so as to engage the finger 22 at the selected terminal.

The Wheatstone bridge resistance or leg 14 remote from the terminal 16 has terminal 28 from which extends line 29. This line 29 extends to resistance 30 connected by line 31 to extend to terminal 32 as a spring arm to be acted upon by a push-button 11. This depression of the push-button 11 against spring arm terminal 26 cuts in this resistance 30 as a fourth leg of the Wheatstone bridge. Further depression of this push-button 11 brings this spring arm 26 (Fig. 5) against adjacent spring arm terminal 22, thereby serving to connect in the energy source and the rheostat or resistance 19. This resistance 30, which is not responsive to temperature change and thus serves as a standard for testing, is preferably so adjusted that the galvanometer 6 has its needle 5 brought to the temperature reading of 70° F. on scale 4 when the battery is in the circuit. Furthermore, to give basis to this function, the resistance 30 is rendered practically effective owing to the fact that the resistance legs 12, 13, 14, of the galvanometer 6 are also non-responsive to temperature changes.

Figure 2:
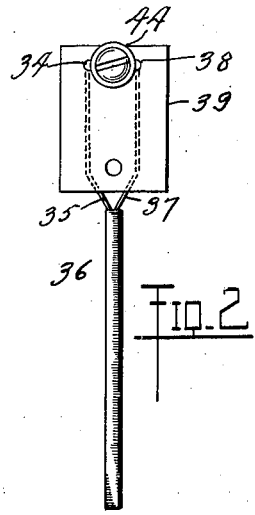
Fig. 2 is a detail view in front elevation of a thermo-sensitive resistance element, and its mounting.
Figure 3:
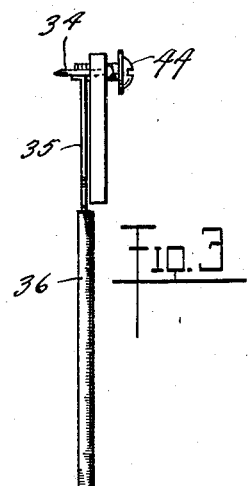
Fig. 3 is a side elevation of the structure of Fig. 2.

For the remote places, lines 33 are extended from the line 29 to provide terminals 34 having lines 35 extending to thermo-responsive resistances 36, and therefrom by lines 37 to terminals 38 (Figs. 2, 3). These terminals 34, 38, are mounted on insulation plate 39 carried in self-ventilating housing 40 which may be located or suspended as desired in the room, bin, or other remote location. From this terminal 38 extends line 41 to resistance 42 and thence by line 43 to the terminal 32 at the central station 1. Short circuiting switch 44 at the remote temperature device housing 40 is screwed in to connect across between the terminals 34, 38, and thereby by-pass the thermo-responsive resistance 36. In making up an installation of the telethermometer hereunder, the various remote places have different lengths of line therefrom to the central station. In order to compensate for such variations and still permit the use of similar or interchangeable instruments at the remote places as well as avoid the expense of common line lengths for an adjacent place as to a remote place, there is placed, adjacent the central station instrument, resistance 42 in series with each resistance 36. Upon making the installation of the telethermometer, the thermo-responsive resistance 36 has in its connection to the central station, a resistance 42 in series therewith. This resistance is adjusted according to the galvanometer and the test resistances.

For instance, the check up may be for the resistance 42 as in series with the resistance 36 at a remote place temperature 70° F. to disclose such condition at the central station instrument. By so installing the connections to the several remote places, there is retained a reliability in the general installation set-up.

The use of a battery 18 is one which may fluctuate as to its condition, and while obtaining a reading for different remote places might check that the temperatures were similar, still the condition at the central station might depart from the real temperature as in the remote place. Accordingly, in order that the battery fluctuation may not be deceptive to the one using the central station instrument, a test resistance 45 is installed so that this resistance from the line 29 connected by line 46 from line 47 to terminal 48 may be connected in with the terminal 32. Upon closing the circuit by push button 49 similar to the push button 11, a test reading may be taken for the disclosure at the galvanometer 6. Assuming this test position for the needle be say at 150° F. on the scale 4, if the needle does not come to this position of 150° F. the resistance 19 is adjusted to bring the needle to this 150° F. position on the scale. With such end attained, the operator may then with assurance take the readings for the remote places in the usual manner by pressing the selected buttons 11. The plurality of spring fingers as assembled back of the push buttons 11 are carried by insulation block 50.

In practice the operator by depressing but a single push-button 11 or 49 has at once disclosed to him a temperature reading on the scale 4 effected by cutting in the selected remote place instrument or thermo-responsive resistance as well as the battery. This action due to the spring arms is a rubbing action giving a good contact and is maintained clean even in locations where fumes may be of a character to affect the terminals. The battery is never in use except at a time of reading. The remote thermo-responsive resistance is never connected into the bridge or battery except at the time of reading. The installation is one simple to operate and effective in use. It has material economies in standardizing installation. In use the switch 44 at the instrument cabinet 40 is backed off to get away from short-circuiting between the terminals 34, 38, and is in that position regularly as the instrument is in use. The equipment is such as to be readily adapted for substitution of battery, galvanometer, or resistance at any time.

What is claimed and it is desired to secure by Letters Patent is:

1. A temperature reading installation embodying a central station, an indicating instrument at said station, an energy source, a temperature responsive resistance in addition to said energy source and remote from said station, connections from said resistance providing a circuit, one of said connections being to said instrument, an additional resistance to which a second of said connections extends from said temperature responsive resistance, switch means for connecting in circuit the energy source for disclosing a reading at the indicating instrument as influenced by said temperature responsive resistance, and a manually operable switch remote from said station and at the temperature responsive resistance in parallel with said temperature responsive resistance in said circuit.

2. A temperature reading installation embodying a Wheatstone bridge, a test resistance, an indicating instrument for the bridge, means for cutting in the test resistance as one leg of the bridge for disclosing a reading on the indicating instrument, a thermo-responsive resistance, and connections to and from this thermo-responsive resistance connectible in substitution of said test resistance for obtaining a reading on the indicating instrument, there being manually operable means at said thermo-responsive resistance in parallel with said thermo-responsive resistance in said circuit, said connections including an additional variable resistance for checking with said test resistance reading.

3. A temperature reading installation embodying a Wheatstone bridge including an energy source, a test resistance, an indicating instrument, a switch for controlling the energy source branch of the bridge and cutting in the test resistance as one leg of the bridge for disclosing a reading on the indicating instrument, a thermo-sensitive resistance, connections to the bridge and switch from the thermo-sensitive resistance, and manually operable switch means at the thermo-sensitive resistance in parallel with said resistance and said connections directly in said circuit, there being in one of said connections an additional resistance connectible for comparison with said test resistance reading.

4. A temperature reading installation embodying a central station, an indicating instrument at said station, an energy source, and remote from said station a thermo-sensitive resistance provided with a housing, a pair of spaced terminals at the housing for leads therefrom, and a screw having a flanged head overlapping said terminals, said screw being carried by the housing and adjustable for short-circuiting between said terminals to by-pass said resistance, thereby effecting reading of the indicating instrument at the central station.

5. A temperature reading installation embodying a central station, an indicating instrument at said station, an energy source, and remote from said station a thermo-sensitive resistance unit comprising a housing, an insulation member therein, a pair of laterally spaced terminals mounted on the member for connection to a circuit including said energy source, a thermo-sensitive resistance connected to said terminals and disposed in said housing, and a screw having a flanged head overlapping said terminals, said screw being in said member and adjustable to be backed off from short-circuiting between said terminals to be effective in said backed off position for leaving said resistance to complete the circuit, thereby effecting reading of the indicating instrument at the central station.

6. A temperature reading installation embodying a central station, an indicating instrument at said central station, an energy source, thermosensitive means remote from said central station, at said central station an electrical conductor having spring fingers, spring arm terminals adjacent said spring fingers, and movable means for effecting shifting between a finger and an adjacent spring arm terminal for circuit control series circuit connection therebetween by flexing each thereafter, thereby effecting reading of the indicating instrument at the central station.

7. A telethermometer embodying a Wheatstone bridge, including an energy source, a bridge terminal to which said energy source is connected on one side, a bus bar to which said energy source is connected on the other side, a second bridge terminal embodying a bus bar, and selective means for connection to said bridge, said means including a plurality of simultaneously movable terminals respectively shiftable to circuit closing position with said bus bars for a single circuit series selective connecting in of said bridge.

8. A telethermometer embodying a Wheatstone bridge including an energy source connected on one side to said bridge, a spring finger carrying bus bar connected to the other side of said energy source, a plurality of resistances connected at one side to said bridge, independent spring arm terminals to which the respective resistances extend, and a second spring finger carrying bus bar for the bridge disposed between the energy source bus bar and the spring arm terminals whereby a selected terminal may cut in a resistance for a leg of said bridge and also cut in said energy source by effecting movement between a pair of opposing fingers and said selected terminal.

9. A temperature reading installation embodying a central station, an indicating instrument at said central station, an energy source, thermosensitive means remote from said central station, at said central station an electrical conductor having a main central section, spring fingers oppositely extending in pairs from said central section, and circuit closing means for selectively coacting with a pair of said fingers by flexing each thereof, thereby effecting reading of the indicating instrument at the central station.

10. A temperature reading installation embodying a central station, an indicating instrument at said central station, an energy source, thermosensitive means remote from said central station, at said central station an electrical conductor having fingers, arm terminals adjacent said fingers, and independently movable means shiftable for effecting shifting between a finger and an adjacent arm terminal relatively one toward the other in succession after the means acts directly on one thereof for a circuit control series circuit connection between the finger and arm by shifting effecting each thereof, thereby affecting reading of the indicating instrument at the central station.

11. A temperature reading installation embodying a central station, an indicating instrument at said central station, an energy source, thermosensitive means remote from said central station, at said central station an electrical conductor having a main central section, fingers oppositely extending in series from said central section, and independently movable circuit closure means for selectively coacting with a pair of said fingers by effecting movement of each thereof relatively one toward the other in succession after the means directly acts on one thereof in thereby effecting reading of the indicating instrument at the central station.

In witness whereof we affix our signatures.

WILLIAM A. BAKER.
CARL H. KUHLMAN.